United States Patent
Kwon et al.

(10) Patent No.: US 7,657,056 B2
(45) Date of Patent: Feb. 2, 2010

(54) APPARATUS FOR IDENTIFYING A PHOTOGRAPHER OF AN IMAGE

(75) Inventors: Seong-Geun Kwon, Daegu (KR); Jeon-Man Park, Seongnam-si (KR); Dong-Han Kang, Daegu (KR); Jae-Gwan Shin, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 661 days.

(21) Appl. No.: 11/145,065

(22) Filed: Jun. 6, 2005

(65) Prior Publication Data

US 2005/0280720 A1 Dec. 22, 2005

(30) Foreign Application Priority Data

Jun. 5, 2004 (KR) .................. 10-2004-0041167
Aug. 19, 2004 (KR) .................. 10-2004-0065364

(51) Int. Cl.
*G06K 9/00* (2006.01)
*H04N 5/225* (2006.01)

(52) U.S. Cl. .................. 382/100; 382/239; 348/207.99

(58) Field of Classification Search .................. 382/100, 382/112, 113–116, 137–138, 156, 168, 181–182, 382/189, 198, 203, 219, 232, 243, 254, 274, 382/276, 291, 305, 312, 313, 318, 239; 713/176; 358/1.15; 348/207.99

See application file for complete search history.

(56) References Cited

U.S. PATENT DOCUMENTS

| 7,084,903 | B2 * | 8/2006 | Narayanaswami et al. ................ 348/207.99 |
| 7,107,451 | B2 * | 9/2006 | Moskowitz ................ 713/176 |
| 7,173,722 | B1 * | 2/2007 | Lapstun et al. ............ 358/1.15 |
| 7,209,571 | B2 * | 4/2007 | Davis et al. ............... 382/100 |
| 7,224,819 | B2 * | 5/2007 | Levy et al. ................ 382/100 |
| 7,313,251 | B2 * | 12/2007 | Rhoads ................... 382/100 |
| 7,370,205 | B2 * | 5/2008 | Ogino .................... 713/176 |

FOREIGN PATENT DOCUMENTS

JP 2004-159219 6/2004

* cited by examiner

*Primary Examiner*—Seyed Azarian
(74) *Attorney, Agent, or Firm*—Roylance, Abrams, Berdo & Goodman, L.L.P.

(57) ABSTRACT

Disclosed is an apparatus for processing image data in a portable terminal equipped with a camera. In the apparatus the image data photographed by the camera are coded by a predetermined coding scheme in a photographing mode of the camera, header information of a stream of the coded image data is generated and inserted into the stream, identifying information is generated as a watermark and the watermark is inserted into the stream, and the stream comprising the watermark is stored.

24 Claims, 9 Drawing Sheets

| Start code 0x00000001 | Forbidden_zero_bit 1 bit (0) | Nal_ref_idc 2 bits (00) | Nal_unit_type 5 bits (01101) | watermark x bytes | Start code 0x00000001 | NAL header 1 byte | SPS | Start code 0x00000001 | NAL header 1 byte | PPS | Start code 0x00000001 | NAL header 1 byte | Coded slice |
|---|---|---|---|---|---|---|---|---|---|---|---|---|---|
| | ← Watermark NAL header → | | | ← Payload → | | | | | | | | | |

Watermark NAL header

Not equal to 0 specifies that content of the NAL unit contains a SPS, PPS or a slice of a reference picture or a slice data partition of a reference picture

| | |
|---|---|
| 0 | unspecified |
| 1 | coded slice |
| 2 | coded slice data partition A |
| 3 | coded slice data partition B |
| 4 | coded slice data partition C |
| 5 | coded slice of an IDR picture |
| 6 | SEI |
| 7 | sequence parameter set |
| 8 | picture parameter set |
| 9 | picture delimiter |
| 10 | end of sequence |
| 11 | end of stream |
| 12 | filler data |
| 13-23 | reserved |
| 24-31 | unspecified |

NAL (network adaptation layer)
IDR (instantaneous decoding refresh)
SEI (supplemental enhancement information)

APPARATUS FOR IDENTIFYING A PHOTOGRAPHER OF AN IMAGE

PRIORITY

This application claims the benefit under 35 U.S.C. 119(a) of an application entitled "Apparatus and Method for Identifying Photographer of Image in Terminal using Camera" filed in the Korean Intellectual Property Office on Jun. 5, 2004 and assigned Serial No. 2004-41167 and Aug. 19, 2004 and assigned Serial No. 2004-65364, the entire contents of which are hereby incorporated by reference.

BACKGROUND OF THE INVENTION

1. Field of the Invention

The present invention relates to an apparatus for an image processing in a terminal equipped with a camera. More particularly, the present invention relates to an apparatus for inserting identification information of a mobile terminal into a photographed image.

2. Description of the Related Art

Generally, an image processing apparatus includes a camera for photographing an image and a display unit for displaying image signals photographed by the camera. The camera may use a Charge Coupled Device (CCD) sensor or a Complementary Metal Oxide Semiconductor (CMOS) sensor, and the display unit may use a Liquid Crystal Display (LCD). With the miniaturization of the camera, the apparatus for photographing the image has also been increasingly miniaturized. Currently, miniaturized digital cameras have become popular, and the camera has been mounted on a portable terminal. The portable terminal may photograph an image, convert the photographed image to a moving picture or a still picture, and display the moving picture or the still picture. Also, the portable terminal may also transmit the photographed image to a base station.

Because the miniaturized digital cameras as described above may be easily carried and may easily photograph an image, they have become popular. Further, because photographing using the miniaturized digital cameras is electrically performed, no audible indication is provided when the photographs are taken. In this case, since it is possible to secretly photograph another person by means of portable terminals without consent of another person, it may infringe upon another person's privacy. Accordingly, the current regulation requires that an audible indication automatically occur when photographs are taken by means of digital cameras. That is, photographing performed by using the cameras mounted on the portable terminals makes a "clicking" sound. This is for notifying other persons that the photographs are being taken by means of the portable terminals.

However, even though the "click" sound automatically occurs, it may be impossible for the other person to hear the "clicking" sound in noisy environments. Further, when a user using the miniature camera prohibits the "click" sound from occurring, another person cannot become aware of being photographed.

Moreover, with the development of the Internet, etc, a person's privacy may be infringed because photographs secretly photographed as described above may be uploaded to websites, etc. Accordingly, a need exists for a portable, photographing terminal whereby, when photographing is performed by means of the camera, information on the terminal taking the photograph or video can be inserted into the photographs. Therefore, the aforementioned problems can be solved.

SUMMARY OF THE INVENTION

Accordingly, the present invention has been made to solve the above-mentioned problems occurring in the prior art, and it is an object of the present invention to provide an apparatus capable of inserting information of a terminal equipped with a camera into a photographed image when photographing is performed.

It is another object of the present invention to provide an apparatus capable of inserting information of a portable terminal equipped with a camera into a photographed image when photographing is performed, and extracting by a terminal receiving the image the information inserted into the image and identifying an owner of the terminal.

It is further another object of the present invention to provide an apparatus capable of compressing and coding an image photographed by a portable terminal equipped with a camera, and inserting information on the terminal into the coded image.

It is still another object of the present invention to provide an apparatus and a method for compressing and coding an image photographed by a portable terminal equipped with a camera, and inserting photographer information into the coded image, so that a receiver extracts information on the terminal from the image, decodes and displays the compressed image, and checks the extracted terminal information.

It is yet another object of the present invention to provide an apparatus and a method capable of compressing and coding an image photographed by a portable terminal equipped with a camera as a still picture, and inserting identifying information into an image stream of the still picture.

It is yet another object of the present invention to provide an apparatus and a method capable of compressing and coding an image photographed by a portable terminal equipped with a camera as a synthesized moving picture of still pictures, and inserting identifying information into an image stream of the synthesized moving picture.

It is yet another object of the present invention to provide an apparatus and a method capable of compressing and coding an image photographed by a portable terminal equipped with a camera as a moving picture, and inserting identifying information into an image stream of the moving picture.

BRIEF DESCRIPTION OF THE DRAWINGS

The above and other objects, features and advantages of the present invention will be more apparent from the following detailed description taken in conjunction with the accompanying drawings, in which:

FIG. 7 is a diagram illustrating a structure of a Moving Picture Experts Group (MPEG) stream into which photographer information is inserted according to an embodiment of the present invention;

DETAILED DESCRIPTION OF EXEMPLARY EMBODIMENTS

Embodiments of the present invention will be described in detail herein below with reference to the accompanying drawings.

In the following description, specific items such as image signal formats, transmission packet formats and image compression schemes are exemplary. It should be apparent to those skilled in the art that the present invention can be easily practiced without the specific examples shown.

Hereinafter, a method for inserting identifying information into a data format of a coded image will be described. Further, the identifying information may be inserted into a photographed image such as a still image as well as a moving picture such as a video. The identifying information can comprise an electronic fingerprint that uniquely identifies the device that captured the image. In an embodiment of the present invention, a description will be given on the assumption that the camera is mounted on a portable terminal. However, the present invention can be also applied to a conventional standalone digital camera. Further, according to an embodiment of the present invention, in the case of a portable terminal, Electronic Serial Numbers (ESNs) or user phone numbers may be used as the identifying information. This information is stored in a centralized database associated with user billing. Therefore an owner of a terminal can be located based on the ESN or phone number. In the case of a camera, a serial number of the camera may be used as the identifying information. Furthermore, the time of photographing and the location may also be added as identifying information.

Figure 1:
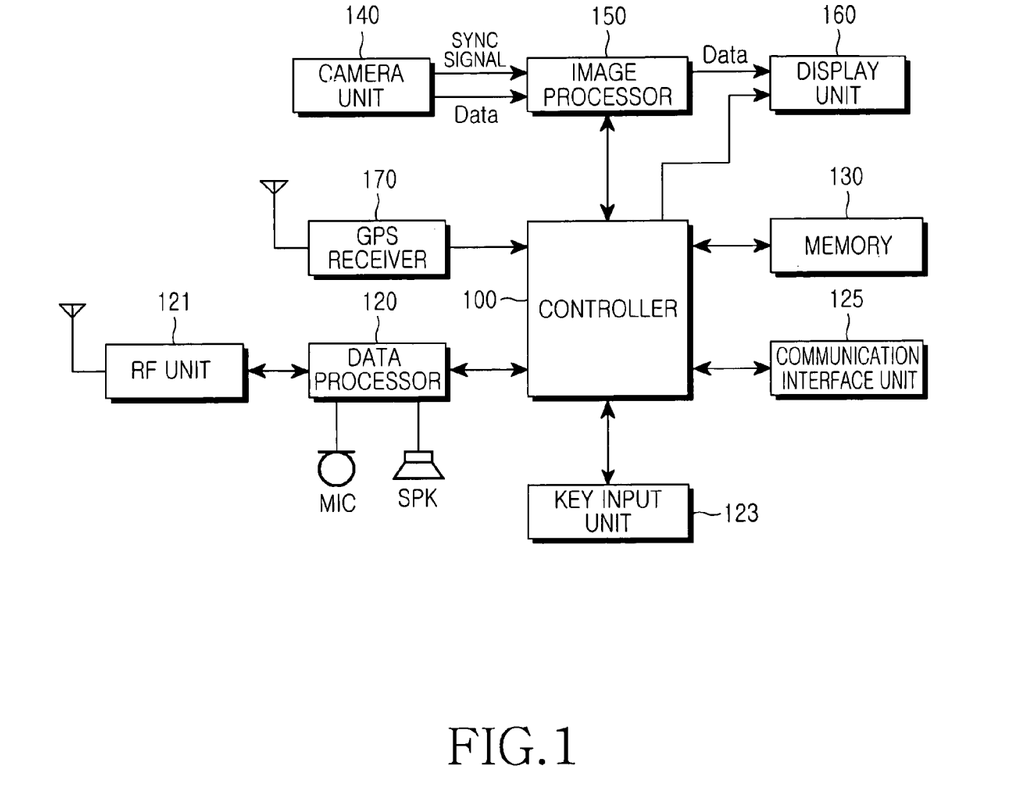
FIG. 1 is a block diagram illustrating a portable terminal equipped with a camera according to an embodiment of the present invention.

FIG. 1 is a block diagram illustrating a portable terminal equipped with a camera according to an embodiment of the present invention. The portable terminal can comprise a portable phone.

Referring to FIG. 1, a Radio Frequency (RF) unit 121 performs a wireless communication function of a portable phone. The RF unit 121 comprises an RF transmitter (not shown) for up-converting and amplifying the frequency of a transmitted signal, an RF receiver (not shown) for low-noise amplifying a received signal and down-converting the frequency of the received signal and so on. A data processor 120 comprises a transmitter (not shown) for coding and modulating the transmitted signal, a receiver (not shown) for demodulating and decoding the received signal and so on. The data processor 120 may comprise a modem and a codec. The modem modulates or demodulates the transmitted/received signals and may use various types of modems using different technologies such as a Code Division Multiple Access (CDMA), a Global System for Mobile (GSM), a Universal Mobile Telecommunications System (UMTS), and so on. The codec comprises a data codec for processing transmission and reception data, and the like and an audio codec for processing transmitted/received audio signals.

A key input unit 123 comprises keys for inputting numerals and text information and function keys for setting various functions. A communication interface unit 125 is connected to an external apparatus through a communication cable and performs a serial communication function with the external apparatus under the control of a controller 100.

A memory 130 may comprise a program memory, a data memory, and a moving picture memory storing image signals generated and received according to the embodiment of the present invention. The program memory may store programs for controlling generation operations of the portable phone and programs for controlling paths of image signals applied to a display unit 160 according to an embodiment of the present invention. Further, the data memory performs a function of temporarily storing data generated while the programs are executed.

The controller 100 performs a function of controlling general operations of the portable phone, which may also comprise the data processor 120. The controller 100 controls operations for photographing, storing, reproducing, transmitting or receiving the image signals based on mode commands set by the key input unit 123 according to an embodiment of the present invention. Further, the controller 100 displays user data on the display unit 160. The user data such as information displayed on the portable terminal may comprise user data for displaying the current time, receiver sensitivity, a battery level, and user data displayed by a setting of a user.

A camera unit 140 comprises a camera sensor for converting optical signals detected in photographing an image into electrical signals and a signal processing unit for converting analog image signals photographed by the camera sensor into digital data. It is assumed that the camera sensor is a CCD sensor, and the signal processing unit may comprise a Digital Signal Processor (DSP). Further, the camera sensor may be integrated with the signal processing unit or the camera sensor may be constructed separately from the signal processing unit.

An image processor 150 generates screen data for displaying the image signals output from the camera unit 140. The image processor 150 processes the image signals output from the camera unit 140 and outputs frame image data in accordance with characteristics and sizes of the display unit 160. Further, the image processor 150 comprises an image codec 250 (see FIG. 2). The image codec 250 codes the image signals using a preset scheme or decodes coded frame image data into the original frame image signals. Furthermore, the image processor 150 photographs or reproduces the image signals according to modes set under the control of the controller 100. The image codec 250 may comprise a Joint Photographic Expert Group (JPEG) codec, a motion JPEG codec, or a Moving Picture Expert Group (MPEG) codec.

The display unit 160 displays the frame image signals output from the image processor 150 on a screen and displays user data output from the controller 100. Further, the display unit 160 displays reproduced moving picture signals under the control of the controller 100. The display unit 160 may use a Liquid Crystal Display (LCD). In this case, the display unit 160 may comprise a LCD controller, a memory capable of storing image data, a LCD display device, etc. When the LCD has a touch screen function, the display unit 160 may operate as an input unit.

A Global Positioning System (GPS) receiver 170 receives GPS information from a GPS satellite to transmit the received GPS information to the controller 100. The GPS information may be information on the current position of the portable phone. In an embodiment of the present invention, photographing position or location information and time information may be received through the GPS receiver 170.

Referring to FIG. 1, when the portable phone uses channels of a CDMA scheme, the modem of the data processor 120 may be a modem conforming to the CDMA scheme. The data processor 120 comprises an audio codec for coding or decoding audio signals according to an embodiment of the present invention.

The portable phone according to the embodiment of the present invention can photograph persons or surrounding environments and display or transmit images of the photographed persons or surrounding environments. The camera unit 140 may be equipped with the portable phone or may be connected to a predetermined position of an exterior of the portable phone. That is, the camera unit 140 may an external-type camera or an internal-type camera. The camera unit 140 may comprise a sensor for photographing an image, a signal processor for converting image signals photographed by the sensor into digital data, etc. The sensor may use a CMOS sensor or a CCD sensor. The images photographed by the camera unit 140 are converted into electrical signals by the internal sensor and the signal processor converts the photographed image signals into digital image data. The converted digital image signals and synchronization signals are output to the image processor 150. The synchronization signals may comprise Horizontal Synchronization signals (Hsyncs), Vertical Synchronization signals (Vsyncs), etc.

Figure 2:
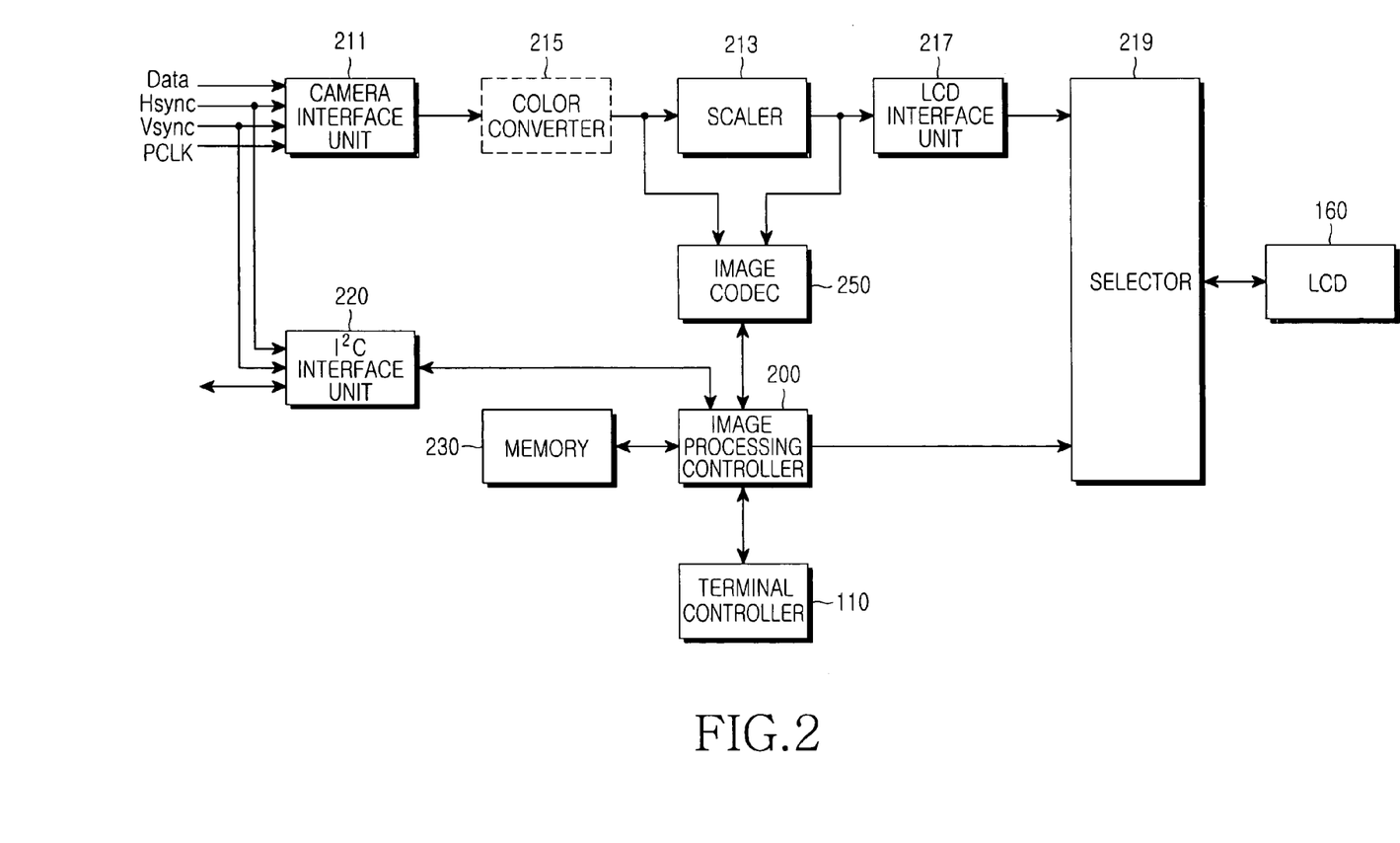
FIG. 2 is a block diagram illustrating of an image processor of FIG. 1 according to an embodiment of the present invention.

FIG. 2 is a block diagram showing a construction of the image processor 150 according to the embodiment of the present invention. The image processor 150 interfaces image signals between the camera unit 140 and the display unit 160 and performs a function of coding and decoding the image signals input from the camera unit 140. As described above, the image processor 150 comprises the image codec 250 for coding and decoding the image signals. In an embodiment of the present invention, the image codec 250 may be a JPEG codec, a motion JPEG codec, an MPEG codec or an H.264 codec.

Referring to FIG. 2, a camera interface unit 211 performs a function of interfacing image data output from the camera unit 140. In the embodiment of the present invention, it is assumed that the image data output from the camera unit 140 are image data of a YUV format and the display unit 160 displays image data of an RGB format.

A scaler 213 scales image signals photographed by the camera unit 140 according to control signals output from the controller 100 so that the image signals can be displayed on the display unit 160. The scaler 213 reduces and crops pixels of the image signals output from the camera unit 140 to be the number of pixels of image signals capable of being displayed on the display unit 160. However, when the display unit 160 can display image data having a size larger than that of the image data output from the camera unit 140, the scaler 213 can be designed to enlarge and display the image signals output from the camera unit 140 under the control of the controller 100. According to a method for enlarging and displaying the image signals, predetermined pixels are selected from among the pixels of the image signals output from the camera unit 140 by the number of pixels of image signals capable of being displayed on the display unit 160, and the selected pixels are displayed on the display unit 160.

A color converter 215 converts YUV data output from the scaler 213 to RGB data and outputs the RGB data. When the camera unit 140 can convert photographed image data to RGB data or the display unit 160 can display image data of a YUV format, the color converter 215 may be omitted.

A LCD interface unit 217 performs a function of interfacing the image data to the display unit 160. The LCD interface unit 217 comprises a buffer therein and can perform a function of buffering the image data interfaced to the display unit 160.

The image codec 250 can perform a function of coding the photographed image data or restoring the coded image data under the control of an image processing controller 200. The image codec 250 inputs and codes the camera image signals output from the color converter 215 or the image signals displayed on the display unit 160 by a predetermined coding scheme under the control of the image processing controller 200. Further, the image codec 250 inserts identification information into the coded image data and generates the coded image data. Furthermore, the image codec 250 extracts the identification information from the coded image data under the control of the image processing controller 200, or decodes the coded image data and outputs the decoded image data to the scaler 213 or the LCD interface unit 217. Herein, the image processing controller 200 may also process key data from the key input unit 123 in processing the image. In an embodiment of the present invention, a description will be given on the assumption that the controller 100 checks the key data from the key input unit 123, and transfers the key data to the image processing controller 200 so that the image processing controller 200 performs commands relating to the image processing when the key data relates to the image processing.

The image processing controller 200 controls generation operations of the image processor 150. That is, the image processing controller 200 controls the display unit 160 under the control of the controller 100 so as to control generation operations for displaying the image data photographed by the camera unit 140. The image processing controller 200 controls the image codec 250 to insert the identification information into the image data or extract the identification information inserted into the image data. According to a method for inserting the identification information into the image data, the identification information may be watermarked to the image data, the identification information may be watermarked to an image data stream or embedded into a data stream. In an embodiment of the present invention, a description will be given on the assumption that the identification information is watermarked to the image data stream, the image data are coded, and the identifying information is watermarked to the stream of the coded image data. Further, it is possible to use a method of inserting the identifying information into the image data before the image data are coded and coding the image data comprising the identifying information.

A memory 230 stores or outputs the image data under the control of the image processing controller 200. The image data stored in the memory 230 may be the photographed image data or the image data received in the portable terminal.

A selector 219 performs a function of selecting the data output from the image processor 150 by path control signals output from the controller 100 or selecting the data output from the controller 100, and outputting the selected data to the display unit 160.

Referring to FIG. 2, in an image photographing mode, the controller 100 transfers a control right of an image processing to the image processing controller 200. Then, the image processing controller 200 controls the user data sent from the controller 100 to be displayed on the display unit 160. Besides, the image processing controller 200 controls an operation allowing the image data photographed by the camera unit 140 to be displayed on the display unit 160 and an operation allowing image signals photographed by commands of a user to be stored in the memory 130. That is, the controller 100 controls operations relating to communication and controls the operations of the display unit 160 only when communication functions are performed. It is assumed that the image processing controller 200 controls the general operations of the display unit 160 in a communication waiting state. When the operation of the camera unit 140 is selected, the image processing controller 200 controls the general operations of the portable terminal.

Hereinafter, an operation for transmitting the image signals photographed by the camera unit 140 to the display unit 160 will be described. First, the image processor 150 processes the image signals photographed by the camera unit 140 and displays the processed image signals on the display unit 160. Herein, the scaler 213 of the image processor 150 can erase some of the pixels of the image signals output from the camera unit 140 so that the image signals can be displayed on the display unit 160, or can select a predetermined area comprising some of the pixels and zoom the selected area. In this case, the photographed image signals are not stored in the memory 230 but displayed on a preview screen of the display unit 160. When the image signals are displayed on the preview screen, the image coding operation is not performed, and the photographer information is not inserted into the photographed image signals.

Further, in the course of displaying the image signals photographed by the camera unit 140 on an image screen of the display unit 160, a user can store the displayed image signals. That is, the user can store the displayed image signals by selecting a function key relating to the image processing from the key input unit 123 or a function relating to the image processing from a menu. When a photographing command occurs, the image processing controller 200 controls the image codec 250 to code the image signals input through the camera interface unit 211, inserts the identifying information into the stream of the coded image data, watermarks the photographer information to the image data, and stores the image data in the memory 230. When the stored image data or the received image data are reproduced, the image processing controller 200 controls the image codec 250 to extract the identifying information watermarked to the image data. The image codec 250 decodes the coded image data and outputs the decoded image data to the scaler 213, so that the decoded image data are displayed on the display unit 160. The image processing controller 200 may display the extracted photographer information on the display unit 160 through the selector 219.

Figure 3:
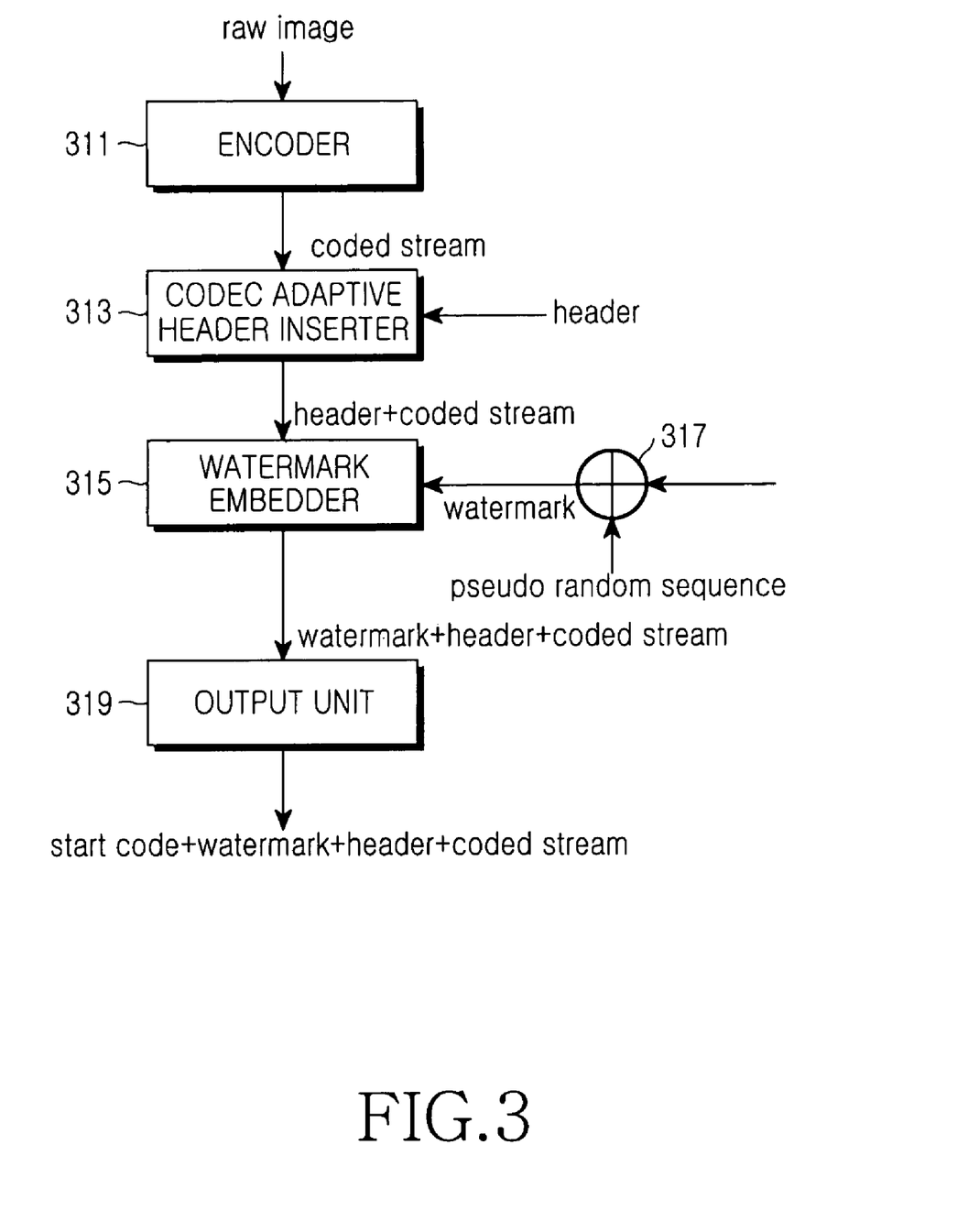
FIG. 3 is a diagram illustrating the image codec of FIG. 2 according to an embodiment of the present invention, which illustrates a process in which identifying information is inserted into a photographed image according to an embodiment of the present invention.

FIG. 3 is a diagram of the image codec 250. FIG. 3 illustrates a process in which the image codec 250 codes the image data by a predetermined coding scheme and inserts the photographer information into the coded image data as a watermark according to an embodiment of the present invention. FIG. 3 shows a structure of the coder, but a decoder operates in a reverse sequence and has a structure similar to that of the coder.

Referring to FIG. 3, an encoder 311 codes the input image data by the predetermined coding scheme. The coding scheme is based on types of image data. That is, the image codec 250 uses different coding methods according to whether photographed image data are still picture data or moving picture data. Further, the image codec 250 may use different coding methods for the still picture data or the moving picture data. In an embodiment of the present invention, it is assumed that a JPEG coder is used for the still picture data and a MPEG 4 coder or a H.264 coder is used for the moving picture data. Also, a motion JPEG coder may be used, which synthesizes still pictures to generate a moving picture, synthesizes the moving picture with audio and text data, and processes the synthesized moving picture. The encoder 311 inputs photographed image data, and compresses and codes the image data by the predetermined coding scheme. The encoder 311 may be one of a JPEG codec, a motion JPEG codec, an MPEG codec or an H.264 codec as described above. A codec adaptive header inserter 313 inserts a header into coded image data stream. Information for the header may be header information according to corresponding coding schemes. The header information is inserted at a predetermined location in the coded image data stream.

A mixer 317 generates a watermark by mixing portable terminal information and pseudo-random sequences, which may use an exclusive OR gate. The portable terminal information is identifying information, and may comprise an ESN and a Mobile Identification Number (MIN). The ESN is a unique number of a portable terminal and represents a number independently assigned to each portable terminal. The MIN is information of the portable terminal and may comprise a phone number of the portable terminal. Further, the portable terminal information may comprise image photographing time and place, etc. Information on the place of photographing may be acquired through the GPS receiver 170. When there is no GPS receiver 170, it is also possible to use information of a base station currently providing radio communication to the portable terminal. The pseudo-random sequence may be a spreading code (PN sequence) used for the portable terminal. Further, it is also possible to use a promised pseudo-random sequence capable of being commonly used for all portable terminals. Otherwise, it may be impossible to use the pseudo-random sequence. In this case, the mixer 317 may be omitted. The photographer information mixed with a specific pseudo-random sequence by the mixer 317 is used as watermark information of image data.

A watermark embedder 315 embeds the watermark output from the mixer 317 into the coded image data stream. That is, the watermark embedder 315 embeds the watermark into a predetermined location of the image data stream constructed by the header and the coded image data. A method for watermarking by the watermark embedder 315 the photographer information to the image data may use a method of embedding the photographer information into the predetermined location of the coded image data stream. That is, when the coded data are stored or transmitted, the coded image data are generated according to a predetermined standard. Accordingly, the watermark embedder 315 embeds the photographer information into the predetermined location of the coded image data stream, and the location into which the photographer information is embedded must be a pre-specified location.

Generally, the format of the coded image data stream comprises a reserved region. Accordingly, a specific portion of the reserved region may be used as a watermarking portion of the photographer information. In the embodiment of the present invention, the predetermined location of the coded image data stream is used as the watermarking portion as described above. In addition to the method for the watermarking as described above, it is also possible to use a method of directly watermarking the photographer information to the image data. The image data stream output from the watermark embedder 315 may be constructed by the watermark (identifying information), the header information and the coded image data stream.

An output unit 319 inserts a start code and an end code into the stream output from the watermark embedder 315, and outputs the coded image data stream. The start code is a code representing a start of the coded image data stream and the end code is a code representing an end of the coded image data stream. Accordingly, the data stream output from the output unit 319 comprises the start code, the watermark, the header, the coded image data and the end code. The watermark embedder 315 may insert the photographer information into a location after the start code, a location after the header information, or a location before the end code.

Figure 4:
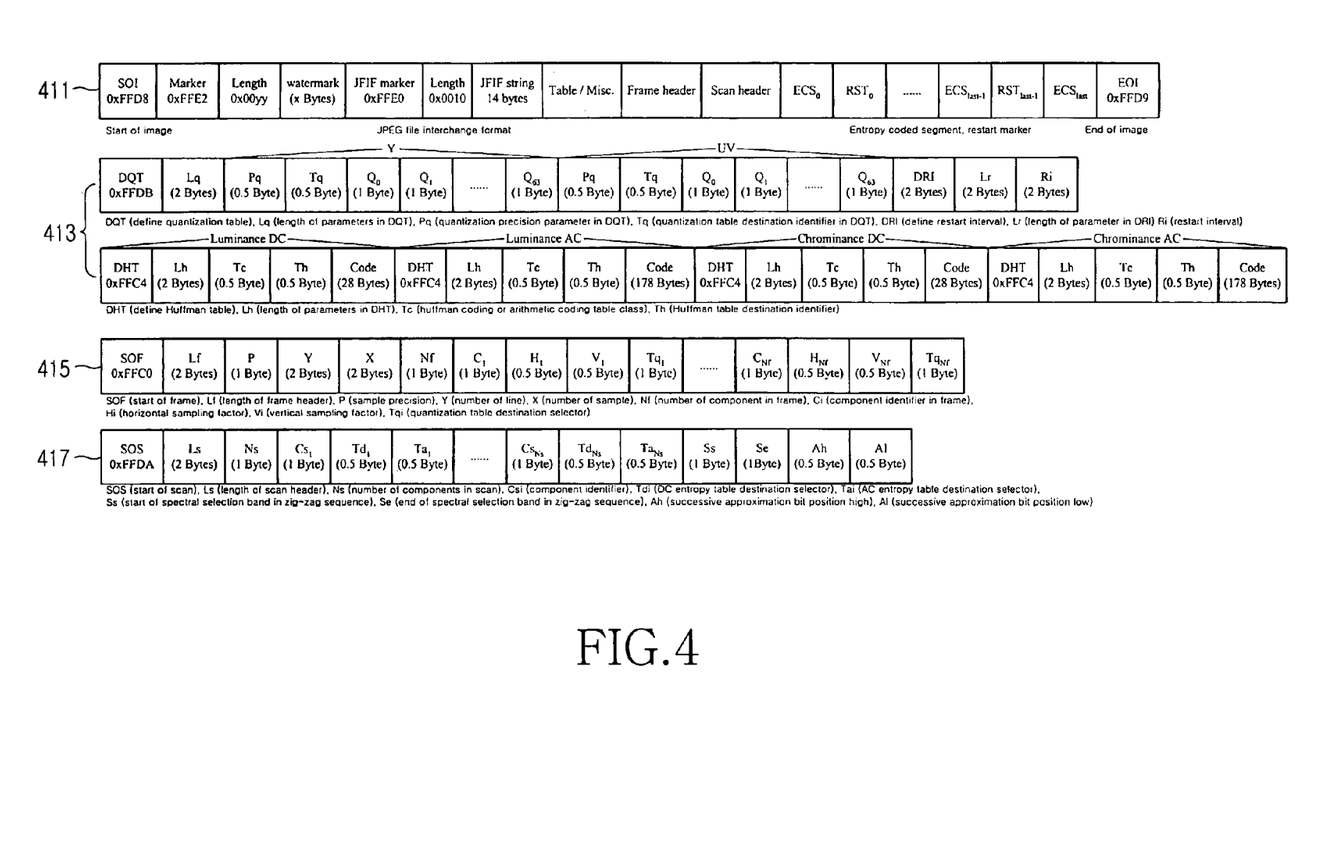
FIG. 4 is a diagram illustrating a structure of a Joint Picture Experts Group (JPEG) stream into which identifying information is inserted into the stream according to an embodiment of the present invention.
Figure 5:
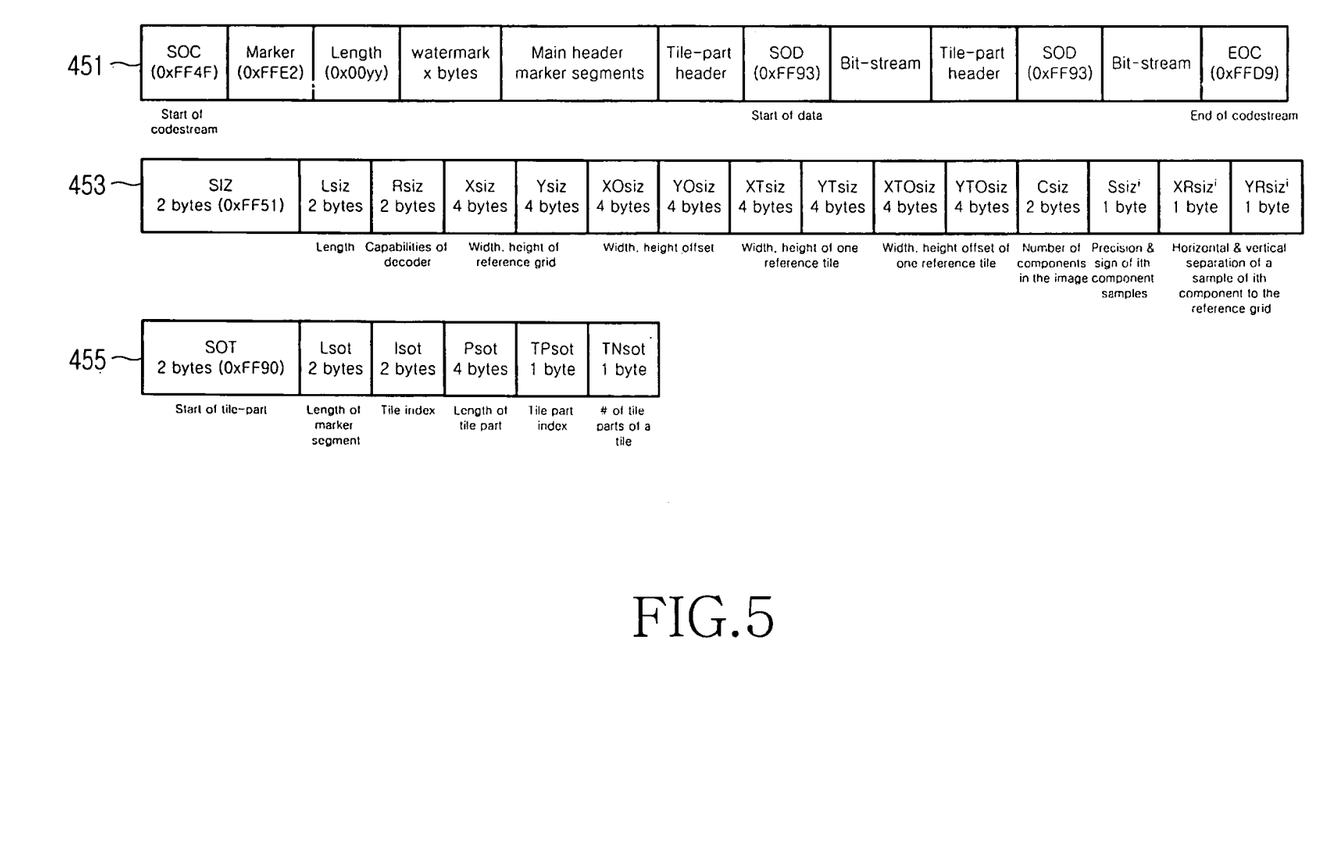
FIG. 5 is a diagram illustrating a structure of a JPEG 2000 stream into which photographer information is inserted according to an embodiment of the present invention.
Figure 6:
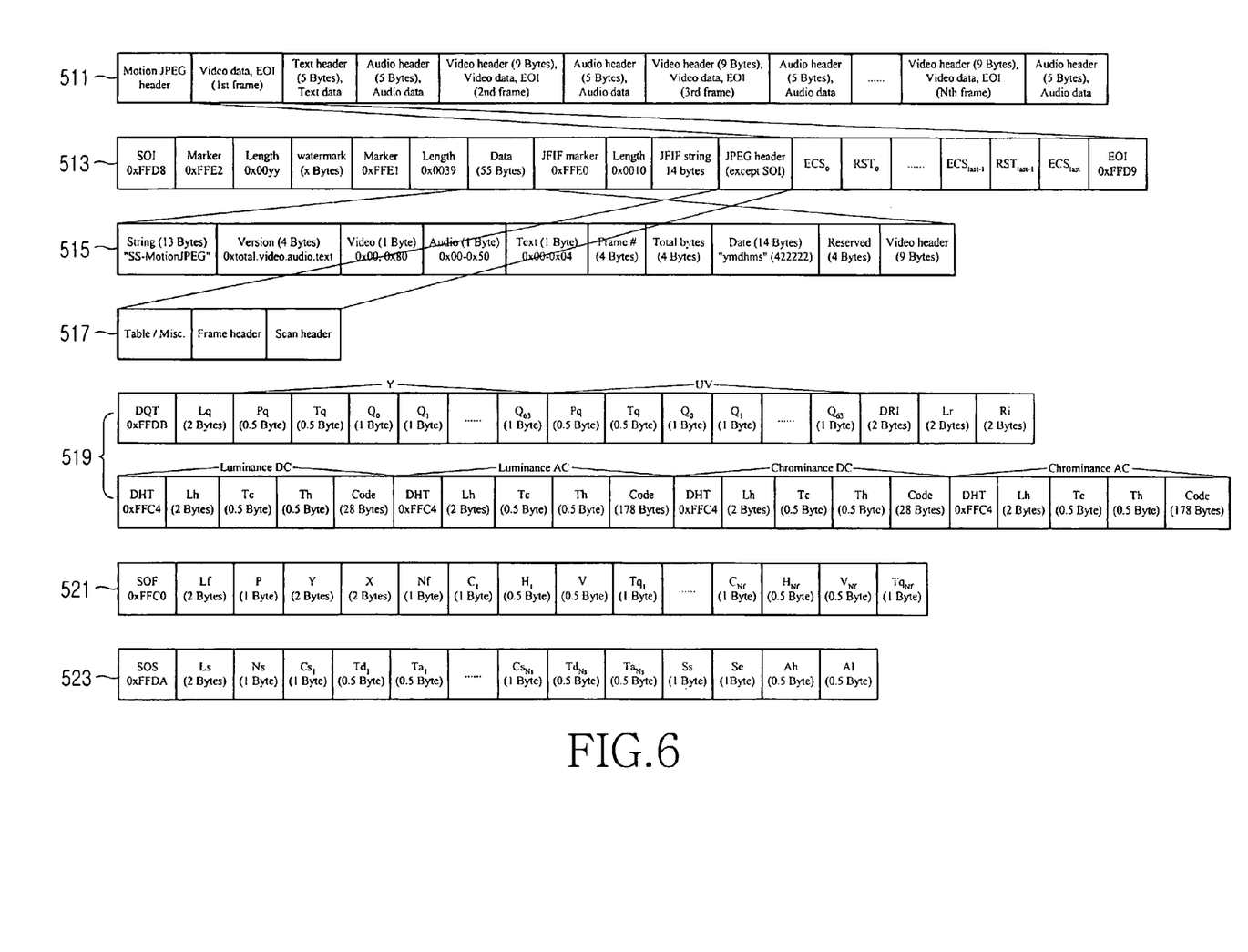
FIG. 6 is a diagram illustrating a structure of a motion JPEG stream into which photographer information is inserted according to an embodiment of the present invention.
Figure 8:
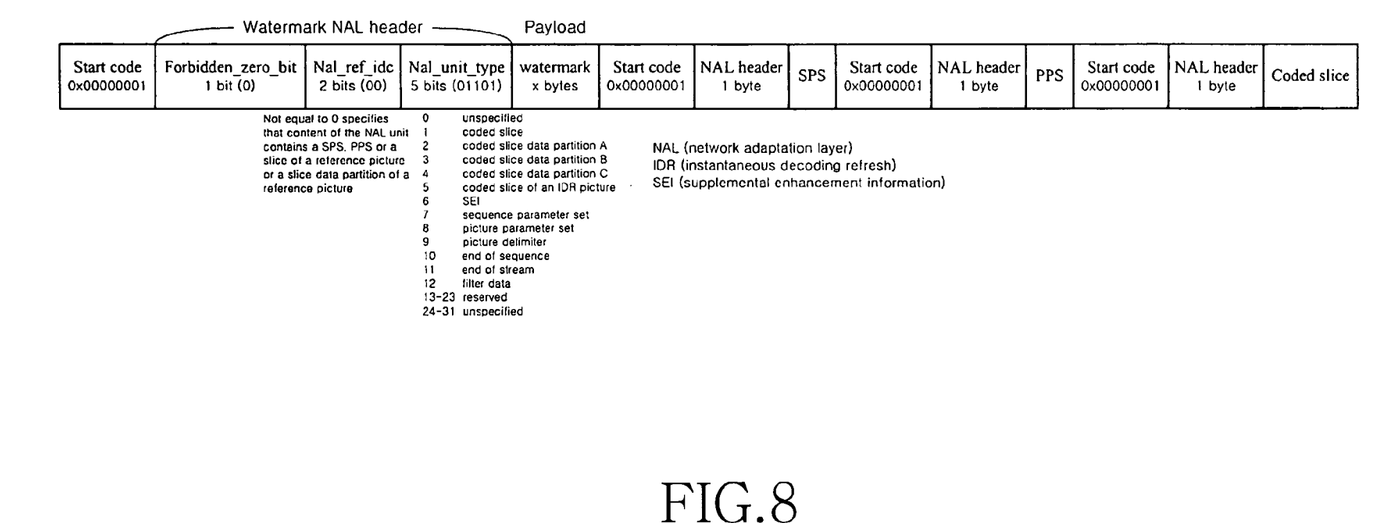
FIG. 8 is a diagram illustrating a structure of an H.264 stream into which photographer information is inserted according to an embodiment of the present invention.

The image codec 250 having the construction as described above generates image streams coded by different formats according to coding schemes. Herein, the image codec 250 may perform a coding for moving picture data as well as a coding for still picture data. Hereinafter, a JPEG coding scheme, a motion JPEG coding scheme, an MPEG coding scheme and an H.264 coding scheme will be described according to the embodiment of the present invention. The JPEG coding scheme is a scheme for coding still pictures. The motion JPEG coding scheme is a scheme for coding still pictures to synthesize the still pictures into a moving picture. The MPEG coding scheme and the H.264 coding scheme are schemes for coding moving picture data. Embodiments of the present invention according to the coding schemes as described above will be described with reference to FIGS. 4 to 8. FIG. 4 is a diagram illustrating a structure of a JPEG stream to which identifying information is watermarked according to an embodiment of the present invention. FIG. 5 is a diagram illustrating a structure of a JPEG 2000 stream to which identifying information is watermarked according to the embodiment of the present invention. FIG. 6 is a diagram illustrating a structure of a motion JPEG stream to which identifying information is watermarked according to the embodiment of the present invention. FIG. 7 is a diagram illustrating a structure of an MPEG stream to which identifying information is watermarked according to the embodiment of the present invention. FIG. 8 is a diagram illustrating a structure of an H.264 stream to which photographer information is watermarked according to the embodiment of the present invention.

Referring to FIG. 4, the image codec 250 may be a JPEG image codec. Image data photographed by the camera unit 140 are applied to the encoder 311. The encoder 311 codes the input image data by the JPEG coding scheme and generates $ECS_0 \sim ECS_{last}$ as shown in a reference number 411 of FIG. 4. The $ECS_0 \sim ECS_{last}$ represent JPEG-coded image data. Then, the JPEG-coded image data are applied to the codec adaptive header inserter 313, so that header information is added to the JPEG-coded image data as shown in the reference number 411. The header information may comprise a JFIF marker, a length, a JFIF string, a table/misc, a frame header and a scan header. The table/misc has a structure as shown in a reference number 413 of FIG. 4, the frame header has a structure as shown in a reference number 415 of FIG. 4, and the scan header has a structure as shown in a reference number 417 of FIG. 4.

The watermark embedder 315 embeds identifying information before the header information as shown in the reference number 411 of FIG. 4. The photographer information comprises a marker for identifying a watermark, a length of the watermark, and the watermark of an X byte. The watermark of the X byte is included in the identifying information, which may be an ESN, an MIN, photographing time and place, or some of these information. The ESN and the MIN are unique information of the portable terminal, which may be information used for identifying photographers or owners of the terminal.

After the photographer information is embedded into the JPEG stream, the output unit 319 inserts a Start Of Image (SOI) and an End Of Image (EOI) into the JPEG stream, and completes and outputs the JPEG-coded image data stream. Then, the image processing controller 200 may store the JPEG stream as shown in the reference number 411 output from the output unit 319 in the memory 230, or transmit the JPEG stream externally by the controller 100.

Referring to FIG. 5, the image codec 250 may be a JPEG image codec. Image data photographed by the camera unit 140 are applied to the encoder 311. The encoder 311 codes the input image data by the JPEG coding scheme and generates a bit stream as shown in a reference number 451 of FIG. 5. The bit stream represents image data coded by a JPEG 2000 scheme. Then, the JPEG-coded image data are applied to the codec adaptive header inserter 313, so that header information is added to the JPEG-coded image data as shown in the reference number 451. The header information comprises a main header marker segment, a plurality of tile part headers, and Start Of Data (SOD). Accordingly, it can be understood that the JPEG 2000 image data have a structure comprising the main header marker segment, the tile part headers, the SOD, and the bit streams as shown in the reference number 451 of FIG. 5. The main header marker segment has a structure as shown in a reference number 453 of FIG. 5, and the tile part header has a structure as shown in a reference number 455 of FIG. 5.

In an embodiment of the present invention, photographer information is watermarked to a reserved region between the SOD and the main header marker segment. For this, the watermark embedder 315 after the codec adaptive header inserter 313 embeds the identifying information before the main header marker segment as shown in the reference number 451 of FIG. 5. The photographer information comprises a marker for identifying a watermark, a length of the watermark, and the watermark of an X byte. The watermark of the X byte is included in the photographer information, which may be an ESN, an MIN, photographing time and place, or some of these information. The ESN and the MIN are unique information of the portable terminal, which may be information used for identifying photographers or owners of the terminal.

After the photographer information is embedded into the JPEG stream, the output unit 319 inserts a Start Of Codestream (SOC) into a start portion of the stream, inserts an End Of Codestream (EOC) into a last portion of the stream, and completes and outputs the image data stream coded by the JPEG 2000 scheme. Then, the image processing controller 200 may store the JPEG 2000 stream as shown in the reference number 451 output from the output unit 319 in the memory 230, or transmit the JPEG 2000 stream to an outside of the terminal by the controller 100.

Referring to FIG. 6, the image codec 250 may be a motion JPEG image codec. The motion JPEG image is a moving picture obtained by synthesizing JPEG images and restructuring the synthesized JPEG image. Further, the motion JPEG image may comprise synthesized audio and/or text data. Accordingly, the motion JPEG image may be synthesized moving picture signals. In this case, the synthesized moving picture data have a structure in which text data are first disposed, and audio data and video data corresponding to a frame size are interlaced by the frame interval. A motion JPEG header is inserted before the synthesized moving picture data. The motion JPEG header has a structure as shown in a reference number 513 of FIG. 6. Further, the motion JPEG header comprises data constituting the motion JPEG as shown in a reference number 515 of FIG. 6, and header information constructed by a table/misc, a frame header and a scan header as shown in a reference number 517 of FIG. 6. The table/misc has a structure as shown in a reference number 519 of FIG. 6, the frame header has a structure as shown in a reference number 521 of FIG. 6, and the scan header has a structure as shown in a reference number 523 of FIG. 6.

The watermark embedder 315 embeds photographer information into the motion JPEG header as shown in the reference number 513 of FIG. 6. The photographer information comprises a marker for identifying a watermark, a length of the watermark, and the watermark of an X byte. The watermark of the X byte is included in the photographer information, which may be an ESN, an MIN, photographing time and place, or some of these information. The ESN and the MIN are unique information of the portable terminal, which may be information used for identifying photographers or owners of the terminal.

After the photographer information is embedded into the motion JPEG stream, the output unit 319 inserts an SOI into a start portion of the motion JPEG header, inserts an EOI into a last portion of the motion JPEG header, and completes the motion JPEG stream as shown in the reference number 513 of FIG. 6. Then, the image processing controller 200 may store the motion JPEG stream output from the output unit 319 in the memory 230, or transmit the JPEG stream to an outside of the terminal by the controller 100.

Referring to FIG. 7, the image codec 250 may be an MPEG4 image codec. A MPEG4 stream has a structure as shown in a reference number 611 of FIG. 7. The MPEG4 stream comprising a visual_object_sequence_start_code representing a start of the MPEG4 stream, a profile_and_level_indication representing attributes and size, a watermark_start_code and a watermark representing a start of a watermark and watermark information, a plurality of visual objects, and a visual_object_sequence_end_code inserted after the last visual object.

Each of the visual objects comprises visual object information and a video object as shown in a reference number 613 of FIG. 7. The video object comprises video object information and a plurality of video_object_layers as shown in a reference number 615 of FIG. 7. Each of the video_object_layer comprises video object information and a group_of_videoobjectplane as shown in a reference number 617 of FIG. 7. The group_of_videoobjectplane has a construction as shown in a reference number 619 of FIG. 7.

FIG. 7 shows an example in which photographer information, that is, the watermark, is disposed before the visual object in the MPEG4 data stream. However, the watermark may be disposed after the start_code or before the end_code in the MPEG4 stream as shown in the reference number 611 of FIG. 7.

Referring to FIG. 8, the image codec 250 may be an H.264 image codec. An H.264 stream has a structure as shown in FIG. 8. The H.264 stream comprises a start code representing a start of the H.264 stream, and a Network Adaptation Layer (NAL) header. The NAL header comprises a forbidden_zero_bit of one bit, a Nal_ref_idc of two bits and a Nal_unit_type of five bits. In the Nal_unit_type of five bits, 0 to 12 are preset and used regions, 13 to 23 are reserved regions, and 24 to 31 are unspecified regions. In the embodiment of the present invention, 13 of the Nal_unit_type is set as a watermark Nal header for use. Accordingly, the watermark Nal header becomes a watermark header. Further, a watermark of X bytes is inserted after the watermark Nal header. In the H.264 stream, the watermark Nal header and the watermark (i.e., payload) are inserted. In FIG. 8, Nal headers and payload information disposed after the watermark are included in an existing structure of the H.264 stream.

When the image data photographed by the image codec 250 are stored or transmitted as described above, the image codec 250 codes the image data. When the image codec 250 codes the image data, the image codec 250 watermarks identifying information to the image data. For this, the image codec 250 codes the image data by a predetermined coding scheme, generates the header information of the coded data stream, and inserts header information into the coded data stream. Then, the image codec 250 inserts the identifying information into the stream comprising the header and the data as a watermark. Further, the image codec 250 inserts a start code into the stream comprising the watermark, the header and the data, and stores or transmits the stream.

Figure 9:
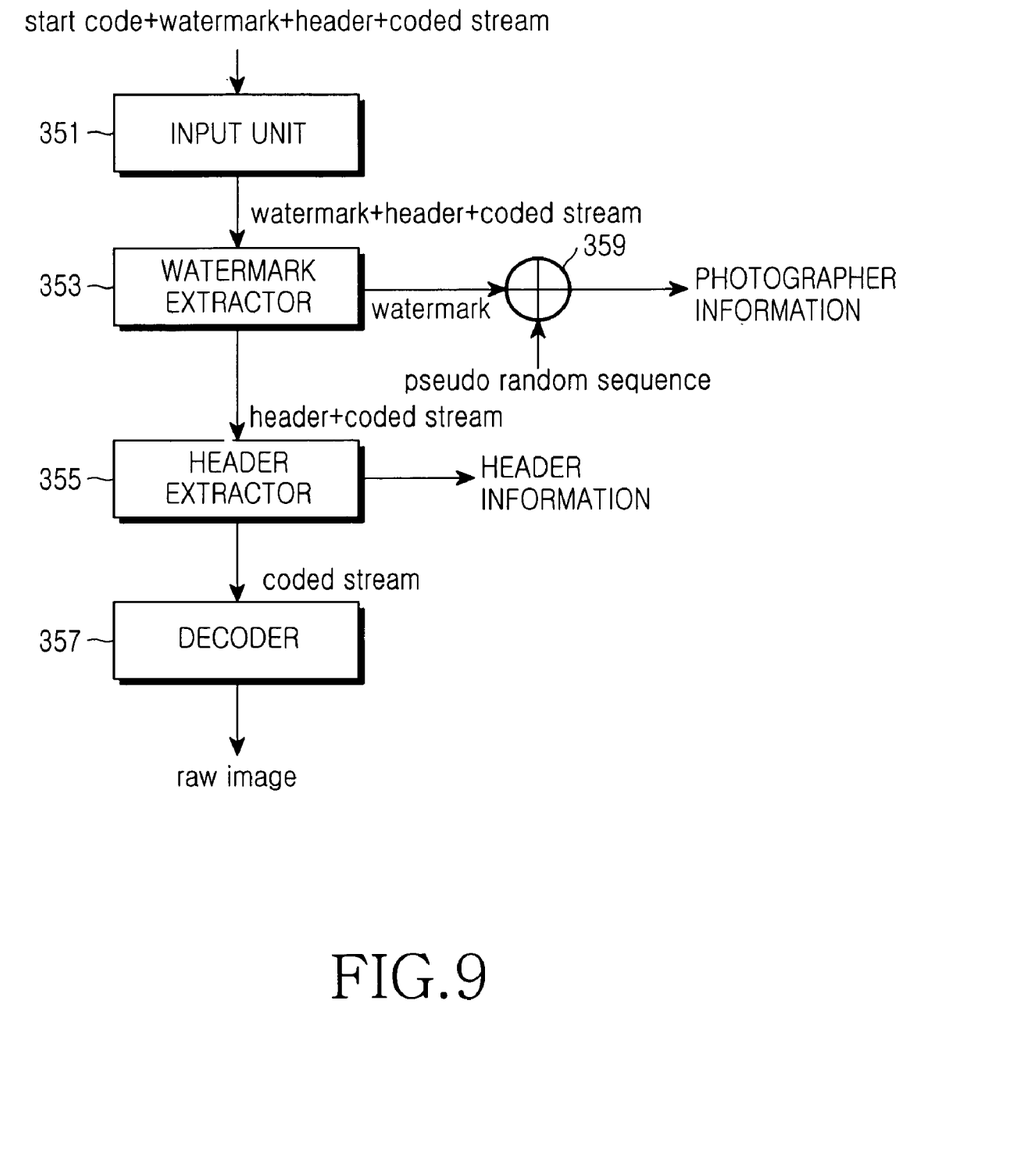
FIG. 9 is a diagram illustrating the image codec of FIG. 2 according to an embodiment of the present invention, which illustrates a process in which identifying information is extracted from image data comprising the terminal information.

As described above, the image codec inserts the identifying information into the coded image data stream. When the identifying information is used as the watermark, it is possible to acquire information of the portable terminal having photographed the image by analyzing the watermark in decoding the image data. An operation of decoding the image data comprising the watermark is performed in sequence reverse to that of the coding operation. FIG. 9 is a diagram showing the decoder of the image codec 250 for decoding the coded data.

Referring to FIG. 9, when the coded data are received, an input unit 351 separates the start code and the end code from the coded image data stream, and extracts and outputs the stream of the watermark, the header and the coded data. Then, a watermark extractor 353 extracts the watermark (i.e., photographer information) inserted at a predetermined location from the data stream constructed by the watermark, the header and the coded data. The size of the watermark may be understood by watermark header information and is extracted according to the watermark header information. The watermark extracted by the watermark extractor 353 is mixed with a random sequence by a mixer 359 to be generated as the original photographer information. The mixer 359 may be an exclusive OR gate, and the random sequence is identical to that used in FIG. 3. The identifying information output from the mixer 359 is the photographer information inserted in the coding, which may comprise the ESN, the MIN, the time and/or the location information. The identifying information may be applied to the image processing controller 200 and then displayed on the display unit 160.

The stream of the header and the coded data output from the watermark extractor 353 is applied to a header extractor 355, and the header extractor 355 extracts the header information. Further, a decoder 357 decodes the coded data stream output from the header extractor 355, and generates the original raw image data. As described above, the decoder of the image codec 250 operates in sequence reverse to that of the coder.

In an embodiment of the present invention, the image codec performs the operation of watermarking the identifying information to the photographed image data. However, in watermarking the identifying information to the photographed image data, information of the terminal may be inserted as the watermark when the camera unit 140 performs the photographing. Further, in an embodiment of the present invention, when the identifying information is inserted into the image data as the watermark, the identifying information is inserted at a predetermined location in the data stream as the payload. However, in addition to the method described, it is also possible to use a method of directly watermarking the identifying information to the photographed image data.

According to an embodiment of the present invention as described above, in a terminal having a camera, identifying information is inserted as a watermark into an image photographed by the camera, so that a place of photographing the image can be traced. Currently, because terminals equipped with cameras have become popular and miniaturized, many persons may be photographed surreptitiously and these photographed images may be rapidly circulated to the public through the Internet, etc. Further, it is impossible to trace photographers via their terminals that have photographed the images. Accordingly, identifying information is inserted into the photographed image, so that it is possible to trace photographers when the images are illegally circulated.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. An apparatus equipped with a camera, the apparatus comprising:
    an image codec for coding image data photographed by the camera;
    a watermark embedder included in the image codec, for embedding information identifying photographer of coded image data into a stream of the coded image data as a watermark;
    a memory for storing the stream of the coded image data comprising the watermark, and wherein the watermark is generated by mixing the identifying information and a pseudo-random sequence, the pseudo-random sequence comprising a spreading code or a sequence commonly used for all portable terminals;
    wherein the identifying information comprises electronic serial number (ESN) information of a portable terminal;
    wherein the apparatus further comprising a communication unit for transmitting the coded image data stored in the memory.

2. The apparatus as claimed in claim 1, wherein the identifying information further comprises a subscriber phone number.

3. The apparatus as claimed in claim 2, wherein the identifying information further comprises photographed location information.

4. The apparatus as claimed in claim 1, wherein the communication unit comprises a communication interface unit connected to an external communication apparatus through a communication cable so as to interface with the external communication apparatus.

5. The apparatus as claimed in claim 4, wherein the communication unit comprises a radio frequency (RF) communication unit for performing RF communication with a base station.

6. An apparatus for processing image data in a portable terminal, the apparatus comprising:
    a camera; an image processor comprising an image codec, for processing the image data photographed by the camera, and applying the photographed image data to the image codec in a record mode;
    the image codec comprising an encoder for coding the image data output from the camera by a predetermined coding scheme, a codec adaptive header inserter for inserting header information into a stream of the coded image data, and a watermark embedder for embedding information identifying photographer of the coded image data into the stream as a watermark;
    a memory for storing the stream comprising the watermark in the record mode;
    and a communication unit for transmitting predetermined coded image data, which are selected from the coded image data stored in the memory, in a communication mode,
    wherein the watermark is generated by mixing the identifying information and a pseudo-random sequence, the pseudo-random sequence comprising a spreading code or a sequence commonly used for all portable terminals;
    wherein the identifying information comprises electronic serial number (ESN) information of a portable terminal.

7. The apparatus as claimed in claim 6, wherein the identifying information further comprises a subscriber phone number.

8. The apparatus as claimed in claim 7, wherein the identifying information further comprises photographed location information.

9. An apparatus for displaying image data, the apparatus comprising:
    a communication unit for receiving image data in a communication mode; an image codec comprising a watermark extractor for extracting a watermark, which has been inserted at a predetermined location in a stream of coded image data output from the communication unit, and generating information identifying photographer of the coded image data, a header extractor for extracting header information from the stream of the coded image data output from the watermark extractor, and a decoder for decoding the stream of the coded image data output from the header extractor and restoring original image data;
    an image processor for processing the image data output from the image codec;
    a display unit for displaying the image data output from the image processor,
    and a mixer for generating the watermark by mixing the identifying information and a pseudo-random sequence, the pseudo-random sequence comprising a spreading code or a sequence commonly used for all portable terminals;
    wherein the identifying information comprises electronic serial number (ESN) information of a portable terminal.

10. The apparatus as claimed in claim 9, wherein the identifying information further comprises a subscriber phone number.

11. The apparatus as claimed in claim 10, wherein the identifying information further comprises photographed location information.

12. The apparatus as claimed in claim 9, wherein the communication unit comprises a radio frequency (RF) communication unit for performing RF communication with a base station.

13. An apparatus for processing image data in a portable terminal, the apparatus comprising:
    a camera;
    an image processor having an image codec for processing the image data output from the camera and the image processor and a number of pieces of the image data;
    a display unit for displaying the image data of the camera;
    a communication unit for transmitting the image data coded by the image codec and outputting received coded image data to the image codec in a communication mode; and the image codec comprising an encoder for coding the image data output from the camera by a predetermined coding scheme, a codec adaptive header inserter for inserting header information into a stream of the coded image data, a watermark embedder for embedding identifying information into the stream as a watermark and outputting the stream to the communication unit, a watermark extractor for extracting the watermark, which has been inserted at a predetermined location in the stream output from the communication unit, and generating the identifying information, a header extractor for extracting the header information from the stream output from the watermark extractor, and a decoder for decoding the stream output from the header extractor and restoring original image data and outputting the restored original image data to the image processor;

wherein the watermark is generated by mixing the identifying information and a pseudo-random sequence, the pseudo-random sequence comprising a spreading code or a sequence commonly used for all portable terminals.

14. A method for processing image data in a portable terminal equipped with a camera, the method comprising the steps of:

coding the image data photographed by the camera using a predetermined coding scheme in a photographing mode of the camera;

generating header information of a stream of the coded image data and inserting the header information into the stream;

generating information identifying photographer of the coded image data as a watermark and inserting the watermark into the stream; and storing the stream comprising the watermark:

wherein the watermark is generated by mixing a pseudo-random sequence and identifying information, and the pseudo-random sequence comprising a spreading code or a sequence commonly used for all portable terminals;

wherein the identifying information comprises electronic serial number (ESN) information of a portable terminal.

15. The method as claimed in claim 14, wherein the identifying information further comprises a subscriber phone number.

16. The method as claimed in claim 15, wherein the identifying information further comprises photographed location information.

17. The method as claimed in claim 15, wherein the subscriber number is linked to an owner of the portable terminal.

18. The method as claimed in claim 14, wherein the ESN is linked to an owner of the portable terminal.

19. A method for processing image data in a portable terminal equipped with a camera, the method comprising the steps of:

extracting a watermark inserted at a predetermined location of a coded data stream in an image reproduction mode and detecting information identifying photographer of the coded data stream from the extracted watermark;

extracting header information from the data stream from which the watermark has been extracted; and decoding the data stream from which the header information has been extracted by a predetermined decoding scheme and displaying the decoded data stream;

wherein the extracted watermark is generated by mixing a pseudo-random sequence and the identifying information, and the pseudo-random sequence comprising a spreading code or a sequence commonly used for all portable terminals;

wherein the identifying information comprises electronic serial number (ESN) information of a portable terminal.

20. A method for processing image data in a portable terminal equipped with a camera, the method comprising the steps of:

coding the image data captured by the camera using a predetermined coding scheme in an image capturing mode of the camera;

generating header information for a stream of the coded image data and inserting the header information into the stream;

generating information identifying photographer of the coded image data as an electronic fingerprint and embedding the electronic fingerprint into the stream; and storing the stream comprising the electronic fingerprint, wherein the electronic fingerprint is generated by mixing a pseudo-random sequence and identifying information, the pseudo-random sequence comprising a spreading code or a sequence commonly used for all portable terminals;

wherein the identifying information comprises electronic serial number (ESN) information of a portable terminal.

21. The method as claimed in claim 20, wherein the image data comprises still images or moving pictures.

22. The method as claimed in claim 20, further comprising: associating a user with the embedded electronic fingerprint via an electronic serial number or phone number of the user terminal.

23. An apparatus equipped with a camera, the apparatus comprising:

an image codec for coding image data photographed by the camera;

a watermark embedder included in the image codec, for embedding identifying information into a stream of the coded image data as a watermark; and a memory for storing the stream of the coded image data comprising the watermark, wherein the watermark is generated by mixing the identifying information and a pseudo-random sequence, the pseudo-random sequence comprising a spreading code or a sequence commonly used for all portable terminals;

wherein the identifying information comprises electronic serial number (ESN) information of a portable terminal;

wherein the apparatus further comprises a communication unit for transmitting the coded image data stored in the memory;

wherein the communication unit comprises a communication interface unit connected to an external communication apparatus through a communication cable so as to interface with the external communication apparatus; and wherein the communication unit comprises a radio frequency (RF) communication unit for performing RF communication with a base station.

24. An apparatus for displaying image data, the apparatus comprising:

a communication unit for receiving image data in a communication mode;

an image codec comprising a watermark extractor for extracting a watermark, which has been inserted at a predetermined location in a stream of coded image data output from the communication unit, and generating identifying information, a header extractor for extracting header information from the stream of the coded image data output from the watermark extractor, and a decoder for decoding the stream of the coded image data output from the header extractor and restoring original image data;

an image processor for processing the image data output from the image codec;

a display unit for displaying the image data output from the image processor; and a mixer for mixing a pseudo-random sequence and the watermark extracted by the watermark extractor, and extracting the identifying information;

wherein the identifying information comprises electronic serial number (ESN) information of a portable terminal;

wherein the communication unit comprises a radio frequency (RF) communication unit for performing RE communication with a base station; and wherein the pseudo-random sequence comprises a spreading code or a sequence commonly used for all portable terminals.

* * * * *

UNITED STATES PATENT AND TRADEMARK OFFICE
CERTIFICATE OF CORRECTION

| | | |
|---|---|---|
| PATENT NO. | : 7,657,056 B2 | Page 1 of 1 |
| APPLICATION NO. | : 11/145065 | |
| DATED | : February 2, 2010 | |
| INVENTOR(S) | : Kwon et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 940 days.

Signed and Sealed this

Thirtieth Day of November, 2010

David J. Kappos
*Director of the United States Patent and Trademark Office*